United States Patent
Brown et al.

(10) Patent No.: US 10,229,180 B2
(45) Date of Patent: Mar. 12, 2019

(54) CONSISTENT POINT-IN-TIME COPY OF A CONSISTENT ASYNCHRONOUS MIRROR TARGET WITHOUT PAUSING A CONSISTENT ASYNCHRONOUS MIRROR COPY

(71) Applicant: INTERNATIONAL BUSINESS MACHINES CORPORATION, Armonk, NY (US)

(72) Inventors: Theresa M. Brown, Tucson, AZ (US); Joshua J. Crawford, Tucson, AZ (US); Gregory E. McBride, Vail, AZ (US); Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 15/611,615

(22) Filed: Jun. 1, 2017

(65) Prior Publication Data
US 2018/0349459 A1 Dec. 6, 2018

(51) Int. Cl.
| | | |
|---|---|---|
| *G06F 12/00* | (2006.01) | |
| *G06F 17/30* | (2006.01) | |
| *G06F 11/14* | (2006.01) | |
| *G06F 11/20* | (2006.01) | |

(52) U.S. Cl.
CPC .... *G06F 17/30578* (2013.01); *G06F 11/1446* (2013.01); *G06F 11/2074* (2013.01); *G06F 11/2066* (2013.01); *G06F 17/30073* (2013.01); *G06F 2201/84* (2013.01)

(58) Field of Classification Search
None
See application file for complete search history.

(56) References Cited

U.S. PATENT DOCUMENTS

| | | |
|---|---|---|
| 6,912,629 B1 | 6/2005 | West et al. |
| 7,610,318 B2 | 10/2009 | Bartfai et al. |
| 8,788,768 B2 | 7/2014 | Clayton et al. |
| 8,819,362 B1 | 8/2014 | Duprey et al. |

(Continued)

OTHER PUBLICATIONS

Notice of Allowance, dated Sep. 6, 2018, for U.S. Appl. No. 15/611,569 (App 18.706) filed Jun. 1, 2017, invented by Theresa M. Brown et al., Total 13 pages.

(Continued)

*Primary Examiner* — John A Lane
(74) *Attorney, Agent, or Firm* — Janaki K. Davda; Konrad, Raynes, Davda and Victor LLP

(57) ABSTRACT

Provided are techniques for delayed consistent point-in-time copy from a secondary device in an asynchronous mirror relationship. A consistent asynchronous mirror copy that includes an asynchronous mirror copy from a primary volume to a secondary volume and a point-in-time copy from the secondary volume to a tertiary volume is performed. A point-in-time copy is created from the secondary volume to an accessible consistent copy volume. In response to receiving a request to access a track of the accessible consistent copy volume, it is determined whether to access the track of one of the secondary volume, the tertiary volume, and the accessible consistent copy volume. A response to the request is provided with data accessed from the determined one of the secondary volume, the tertiary volume, and the accessible consistent copy volume.

20 Claims, 10 Drawing Sheets

(56) References Cited

U.S. PATENT DOCUMENTS

| | | |
|---|---|---|
| 9,280,296 B2 | 3/2016 | Crawford et al. |
| 9,424,152 B1 | 8/2016 | Raut et al. |
| 2009/0313428 A1 | 12/2009 | De Jong |
| 2014/0025770 A1 | 1/2014 | Wartield et al. |
| 2015/0286433 A1* | 10/2015 | Dain .................... G06F 3/0619 |
| | | 711/103 |
| 2015/0301906 A1 | 10/2015 | Crockett et al. |
| 2016/0062851 A1 | 3/2016 | Sugabrahmam et al. |
| 2018/0150504 A1 | 5/2018 | Lee et al. |
| 2018/0276078 A1* | 9/2018 | Blea .................... G06F 11/1451 |
| 2018/0284988 A1* | 10/2018 | Brown .................. G06F 3/065 |

OTHER PUBLICATIONS

Mell et al., "Effectively and Securely Using the Cloud Computing Paradigm", dated Oct. 7, 2009, NIST Cloud Computing Resources, Total 80 pages.

Mell et al., "The NIST Definition of Cloud Computing", dated Sep. 2011, Recommendations of the National Institute of Standards and Technology, Computer Security Division Information Technology Laboratory National Institute of Standards and Technology, Total 7 pages.

US Patent Application, dated Jun. 1, 2017 for U.S. Appl. No. 15/611,569 (App 18.706) filed Jun. 1, 2017, invented by Theresa M. Brown et al., Total 46 pages.

List of IBM Patents or Patent Applications Treated as Related, pp. 2, dated Jun. 1, 2017.

Notice of Allowance dated Jan. 9, 2019, pp. 12, for U.S. Appl. No. 15/611,569.

* cited by examiner

CONSISTENT POINT-IN-TIME COPY OF A CONSISTENT ASYNCHRONOUS MIRROR TARGET WITHOUT PAUSING A CONSISTENT ASYNCHRONOUS MIRROR COPY

BACKGROUND

1. Field of the Invention

Embodiments of the invention relate to consistent point-in-time copy of a consistent asynchronous mirror target without pausing the consistent asynchronous mirror copy.

2. Description of the Related Art

Data storage systems, particularly at the enterprise level, are usually designed to provide a high level of redundancy to reduce the risk of data loss in the event of failure of a component of the data storage system. Thus, multiple copies of data are frequently stored on multiple systems, which may be geographically dispersed. Thus, data from a host to be stored in the data storage system is typically directed to a primary system at a local site and then replicated to a secondary system, which may be geographically remote from the primary system.

The process of replicating, that is, copying data over to the secondary system may be set up in either a synchronous or an asynchronous relationship between the primary system and the secondary system. In a synchronous relationship, any updates to the primary system are typically synchronized with the secondary system, that is, successfully copied over to the secondary system, before the primary system reports to the host that the data storage input/output operation has been successfully completed. As a result, data storage to a primary storage system and a secondary system in a synchronous relationship may adversely affect system performance of the host while the host awaits completion of the synchronous copy operations. In storage systems in which the primary and secondary systems are widely separated, delays to completion of the synchronous copy operations may be greater, which can further adversely affect host performance. For example, in storage systems in which the primary system and the secondary system are separated by a geographical distance of 300 kilometers (Km) or more, for example, there can be a delay of 3-5 seconds (or more) before the data is successfully replicated at the secondary system.

As a result, storage systems frequently employ an asynchronous relationship between a primary system and a secondary system, particularly if the secondary system is geographically distant from the primary system. In an asynchronous relationship, successful updates to the primary system are typically reported to the host as a successful storage input/output operation without waiting for the update to be replicated to the secondary system. As a result, the host need not wait for the data replication to the secondary system to be completed, and the performance of the host system may be enhanced accordingly.

As the name suggests, in an asynchronous relationship, the primary system and the secondary system may not be fully synchronized at any one time. Thus, data stored on the secondary system typically lags that stored in the primary system. Accordingly, new data stored on a primary system may not be stored on the secondary system for an interval of time such as 3-5 seconds, for example.

In data replication systems, data is typically maintained in volume pairs, comprising a primary volume in a primary storage device and a corresponding secondary volume in a secondary storage device that includes an identical copy of the data maintained in the primary volume. The primary and secondary volumes are identified by a copy relationship in which the data of the primary volume, also referred to as the source volume, is copied to the secondary volume, also referred to as the target volume. Primary and secondary storage controllers may be used to control access to the primary and secondary storage devices.

A near instantaneous copy of a volume may be generated using a point-in-time copy function such as the IBM® FlashCopy® function, for example. (IBM and FlashCopy are registered trademarks or common law marks of International Business Machines Corporation in the United States and/or other countries.) The point-in-time copy function creates a "snapshot" of the contents of a source volume as of a particular point-in-time in a target volume which may be referred to as the point-in-time copy volume. One version of a point-in-time copy function transfers the contents of the source volume to the point-in-time copy volume in a background copy operation. The point-in-time copy function may also be referred to as a point-in-time snap copy function. A point-in-time copy may be described as a copy of the data consistent as of a particular point-in-time, and would not include updates to the data that occur after the point-in-time A point-in-time copy involves establishing a logical point-in-time relationship between source and target volumes on the same or different devices. The point-in-time copy guarantees that until a track in a point-in-time relationship has been hardened to its location on the target disk, the track resides on the source disk. A relationship table is used to maintain information on all existing point-in-time relationships in the subsystem. During the establish phase of a point-in-time relationship, one entry is recorded in the source relationship table for the source and in the target relationship table for the target that participate in the point-in-time being established. Each added entry maintains all the required information concerning the point-in-time relationship. Both entries for the relationship are removed from the relationship tables when all point-in-time tracks from the source extent have been physically copied to the target extents or when a withdraw command is received. In certain cases, even though all tracks have been copied from the source extent to the target extent, the relationship persists.

The target relationship table further includes a bitmap that identifies which tracks involved in the point-in-time relationship have not yet been copied over and are thus protected tracks. Each track in the target device is represented by one bit in the bitmap. The target bit is set (e.g., either logically or physically) when the corresponding track is established as a target track of a point-in-time relationship. The target bit is reset when the corresponding track has been copied from the source location and destaged to the target device due to writes on the source or the target device, or a background copy task.

Once the logical relationship is established, hosts may then have immediate access to data on the source and target volumes, and the data may be copied as part of a background operation. A read to a track that is a target in a point-in-time relationship and not in cache triggers a stage intercept, which causes the source track corresponding to the requested target track to be staged to the target cache when the source track has not yet been copied over and before access is provided to the track from the target cache. This ensures that the target has the copy from the source that existed at the point-in-time of the point-in-time copy. Further, any destages to tracks on the source device that have not been copied over triggers a destage intercept, which causes the tracks on the source device to be copied to the target device.

Another version of a point-in-time copy function omits the background copy operation. Thus, the contents of the source volume are not transferred to the point-in-time copy volume in a background copy operation but are transferred in response to an update of the source volume. Accordingly, any read operations directed to a track of the point-in-time copy volume are usually redirected to obtain the contents of that track from the source volume. However, if the host directs an update to a track of the source volume, the contents of the track of the source volume are transferred to the point-in-time copy volume before the update is permitted to overwrite the contents of that track of the source volume.

In a synchronous data replication system, a point-in-time copy volume may be made of a primary volume at the primary system with respect to the contents of the primary volume as of a particular point-in-time, and a point-in-time copy volume may be made of a secondary volume at the secondary system with respect to the contents of the secondary volume as of the same point-in-time Because the primary and secondary volumes are synchronized, the respective point-in-time copy volumes will also be synchronized and therefore consistent with each other notwithstanding that the point-in-time copy volumes are made in different places, that is, the primary system and the secondary system.

In an asynchronous data replication system, a point-in-time copy volume may also be made of a primary volume at the primary system with respect to the contents of the primary volume as of a particular point-in-time Similarly, a point-in-time copy volume may be made of a secondary volume at the secondary system with respect to the contents of the secondary volume as of a particular point-in-time However, because the primary and secondary volumes are not synchronized, the respective point-in-time copy volumes will also not be synchronized and therefore will not be consistent with each other. Hence, to provide a backup copy of a point-in-time copy volume of a primary volume at the primary system, the point-in-time copy volume generated at the primary system is typically transferred over a network to the secondary system.

To maintain a degree of consistency of data across multiple volumes at a secondary system, a Peer-to-Peer Remote Copy (PPRC) function supports the concept of a PPRC consistency group. Volumes in a PPRC relationship that are configured into a PPRC consistency group are maintained to ensure that a group of updates made to volumes at the primary system are also eventually made on the volumes at the secondary system to maintain data consistency for those volumes of the group. Accordingly, consistency groups may be formed between volumes of the primary system and the secondary system which are consistent with respect to a particular set of updates or a particular point in time, notwithstanding the overall asynchronous relationship between the primary system and the secondary system.

One of the volumes of the primary system which may be in a consistency group with volumes at the secondary system, may itself be a target of a point-in-time copy as long as the point-in-time copy relationship is initiated prior to formation of the consistency group which includes the target volume of the point-in-time copy.

SUMMARY

Provided is a computer program product for delayed consistent point-in-time copy from a secondary volume of a consistent asynchronous mirror copy. The computer program product comprises a computer readable storage medium having program code embodied therewith, the program code executable by at least one processor to perform: performing a consistent asynchronous mirror copy that includes an asynchronous mirror copy from a primary volume to a secondary volume and a point-in-time copy from the secondary volume to a tertiary volume; creating a point-in-time copy from the secondary volume to an accessible consistent copy volume; in response to receiving a request to access a track of the accessible consistent copy volume, determining whether to access the track of one of the secondary volume, the tertiary volume, and the accessible consistent copy volume; and responding to the request with data accessed from the determined one of the secondary volume, the tertiary volume, and the accessible consistent copy volume.

Provided is a computer system for delayed consistent point-in-time copy from a secondary volume of a consistent asynchronous mirror copy. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: performing a consistent asynchronous mirror copy that includes an asynchronous mirror copy from a primary volume to a secondary volume and a point-in-time copy from the secondary volume to a tertiary volume; creating a point-in-time copy from the secondary volume to an accessible consistent copy volume; in response to receiving a request to access a track of the accessible consistent copy volume, determining whether to access the track of one of the secondary volume, the tertiary volume, and the accessible consistent copy volume; and responding to the request with data accessed from the determined one of the secondary volume, the tertiary volume, and the accessible consistent copy volume.

Provided is a method for delayed consistent point-in-time copy from a secondary volume of a consistent asynchronous mirror copy. The method comprises: performing, with a processor of a computer, a consistent asynchronous mirror copy that includes an asynchronous mirror copy from a primary volume to a secondary volume and a point-in-time copy from the secondary volume to a tertiary volume; creating a point-in-time copy from the secondary volume to an accessible consistent copy volume; in response to receiving a request to access a track of the accessible consistent copy volume, determining whether to access the track of one of the secondary volume, the tertiary volume, and the accessible consistent copy volume; and responding to the request with data accessed from the determined one of the secondary volume, the tertiary volume, and the accessible consistent copy volume.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
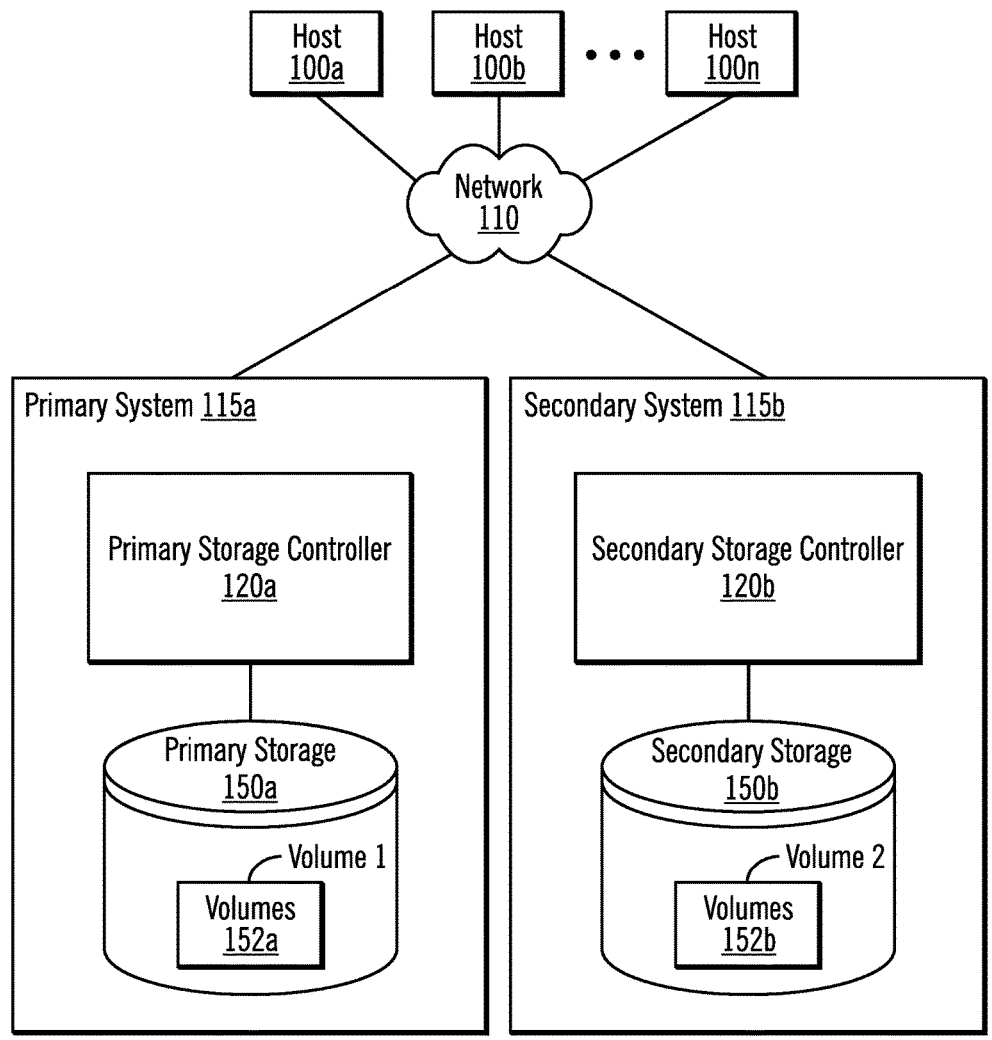
FIG. 1 illustrates, in a block diagram, a computing environment with a primary storage controller and a secondary storage controller in accordance with certain embodiments.

FIG. 1 illustrates, in a block diagram, a computing environment with a primary storage controller and a secondary storage controller in accordance with certain embodiments. A plurality of hosts 100a, 100b, . . . 100n are coupled, via a network 110, to a primary storage controller 120a of a primary system 115a and to a secondary storage controller 120b of a secondary system 115b. The plurality of hosts 100a, 100b, . . . 100n may submit Input/Output (I/O) requests to the storage controllers (or storage control units) 120a, 120b over the network 110 to access data at volumes 152a in primary storage 150a and 152b in primary storage 150b. The volumes may be, for example, Logical Unit Numbers, Logical Devices, Logical Subsystems, etc.. The primary storage 150a and the secondary storage 150b may be storage drives.

In FIG. 1, the storage controller 120a and the storage 150a have been configured as a primary storage control unit and the primary storage, respectively, of a primary system 115a. Similarly, the storage controller 120b and its data storage 150b have been configured as a secondary storage control unit and a secondary storage, respectively, of a secondary system 115b. Hence, in the configuration depicted in FIG. 1, the storage controller 120a will be referred to as a primary storage controller or control unit 120a, and the data storage 150a will be referred to as a primary storage 150a. Similarly, the storage controller or control unit 120b will be referred to as a secondary storage controller or control unit 120b and the data storage 150b will be referred to as a secondary data storage 150b.

In a particular copy relationship, the source unit is often referred to as the primary, and the target unit is often referred to as the secondary. Replication relationships are defined between storage units of the data storage 150a and 150b. Notwithstanding a reference to the data storage 150a as "primary" and the data storage 150b as "secondary," particular storage units of the data storage 150a and the storage 150b may play both a primary (or source role) and a target (or secondary role) depending upon the particular copy relationship.

As noted above, the computing environment includes one or more hosts 100a, 100b, . . . 100n writing updates to the primary storage controller 120a for storage in the primary storage 150a.

With embodiments, the primary storage controller 100a is located at a first site and the secondary storage controller 100b is located at a second site, which may be geographically or functionally remote from the first site. Thus, in such embodiments, the first site may be at a local site and the second site may be at geographically remote sites separated by a short or long geographical distance from the local site and from each other. Alternatively, the local and remote site may be relatively close, such as in different buildings in the same general geographical location, in different rooms of the same building, in different machines in the same room, or in different portions or partitions of the same machine, of the network 110.

Figure 2:
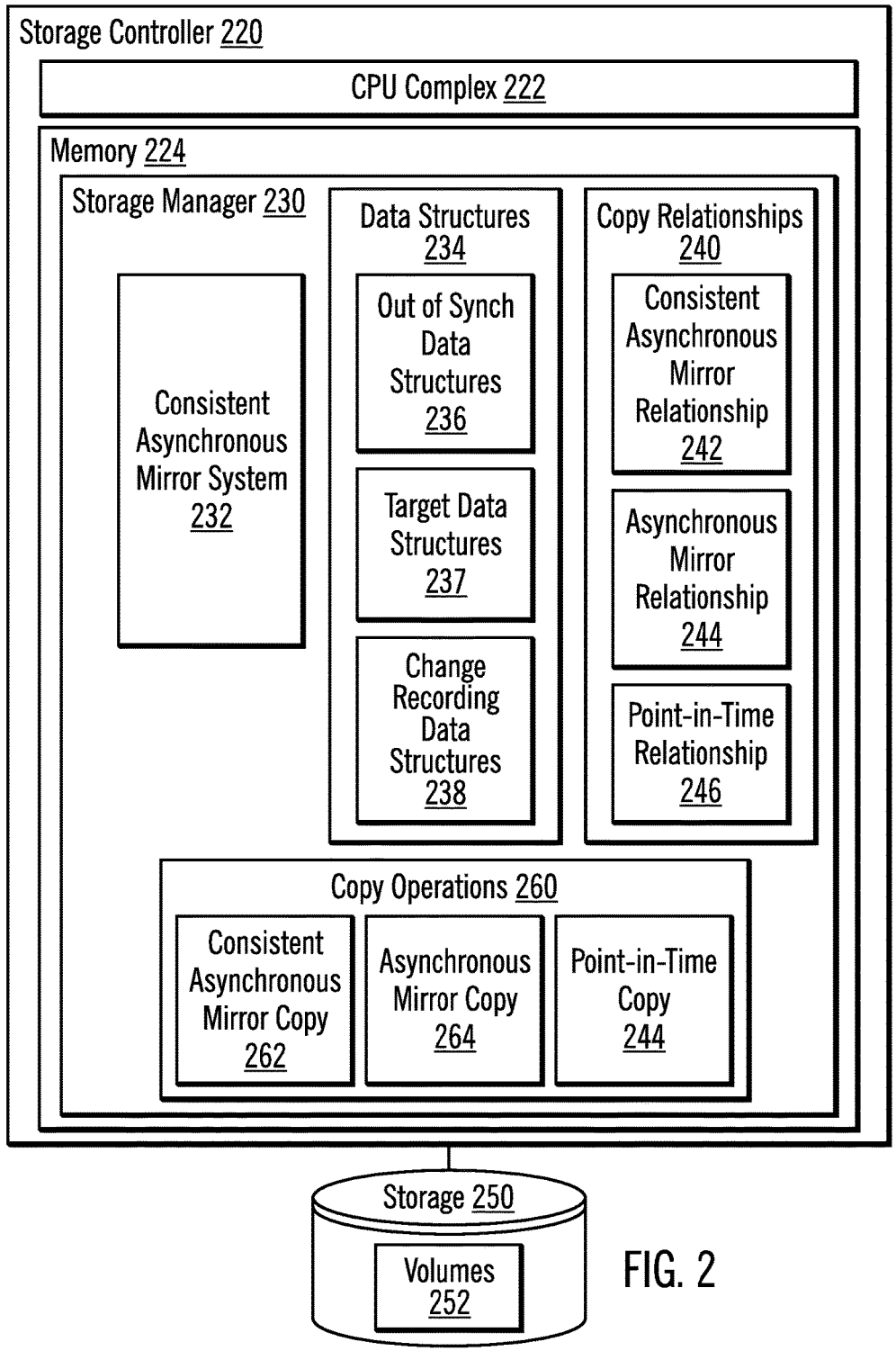
FIG. 2 illustrates, in a block diagram, further details of a storage controller in accordance with certain embodiments.

FIG. 2 illustrates, in a block diagram, further details of a storage controller 220 in accordance with certain embodiments. The primary storage controller 120a and the secondary storage controller 120b may each include the components of storage controller 220. The storage controller 220 includes a Central Processing Unit (CPU) complex 222, including one or more processors or central processing units, each having a single or multiple processor cores. In certain embodiments, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Also, the storage controller 220 includes a memory 224 that includes a storage manager 230 for managing storage operations, including data replication operations from storage 250 (acting as primary storage) to a secondary storage. The storage manager 230 includes a consistent asynchronous mirror system 232, data structures 234 (e.g., bitmaps), copy relationships 240, and copy operations.

The data structures 234 include Out-of-Synch (OOS) data structures 236 (e.g., OOS bitmaps), target data structures 237 (e.g., target bitmaps or TBMs), and change recording data structures 238 (e.g., change recording bitmaps). An OOS data structure 236 is used by the asynchronous mirror copy operation and is stored on the source volume (instead of on the target volume) to determine which tracks are out of sync with the secondary volume. A target data structure 237 is used by the point-to-point copy operation and is stored on the target volume (instead of on the source volume). The target data structure 237 has an indicator (e.g., a bit) for each track and starts with every indicator set (e.g., to one). If an indicator is set, it means the data for the track is at the source, and, if the indicator is reset (e.g., to zero), it means the data for the track is at the target.

The copy operations 260 include a consistent asynchronous mirror copy 262 (e.g., a global mirror copy), an asynchronous mirror copy 264 (e.g., a global copy), and a point-in-time copy 266. The copy relationships 240 include a consistent asynchronous mirror relationship 242 (for a consistent asynchronous mirror copy), an asynchronous mirror relationship 244 (for an asynchronous mirror copy), and a point-in-time relationship 246 (for a point-in-time copy). A consistent asynchronous mirror copy may be referred to as a consistent asynchronous mirror copy operation. An asynchronous mirror copy may be referred to as an asynchronous mirror copy operation. A point-in-time copy may be referred to as a point-in-time copy operation. With embodiments, at any time, there may be one or more of each of the copy relationships 240 and copy operations 260.

Figure 3:
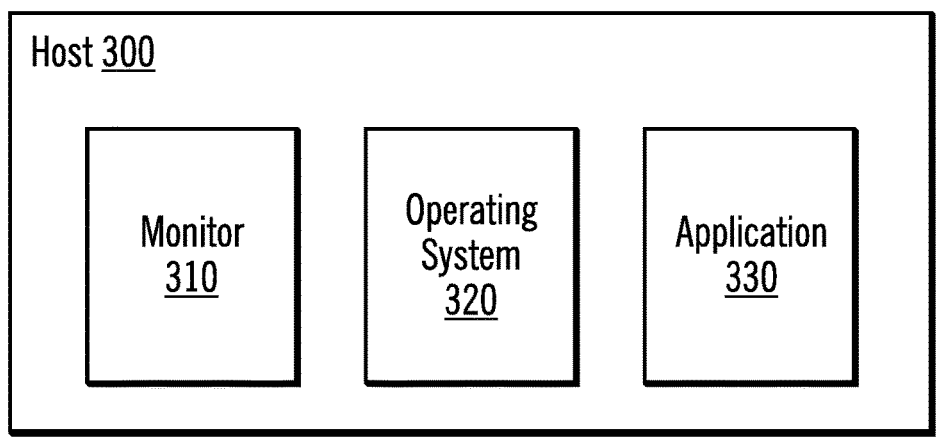
FIG. 3 illustrates, in a block diagram, further details of a host in accordance with certain embodiments.

FIG. 3 illustrates, in a block diagram, further details of a host 300 in accordance with certain embodiments. Each of the hosts 100a, 100b, . . . 100n may each include the components of host 300. Host 300 includes a monitor 310, an operating system 320, and an application 330. The monitor program 310 monitors failures in the availability of the primary storage controller 120a and its associated data storage 150a. In some embodiments, the monitor program 216 may be operated in a device apart from the hosts. A host that includes the monitor program 310 may omit update writing applications 330 in some embodiments. The application 330 reads data from and writes updates via a storage controller 120a, 120b to the primary storage 150a or secondary storage 150b.

With embodiments, the storage manager 230, including the consistent asynchronous mirror system 232, is depicted as software stored in the memory 224 and executed by the CPU complex 222. However, it is appreciated that the logic functions of the storage manager 230 may be implemented as hardware, software, firmware or combinations of one or more thereof, depending upon the particular application.

The copy relationships 240, which may be maintained by the consistent asynchronous mirror system 234 (e.g., for the primary and secondary storage controllers 120a, 120b (FIG. 1)) associate primary storage locations in the primary storage 150a and corresponding secondary storage locations in the secondary storage 150b, such that updates by a host to the primary storage 150a locations are copied to the corresponding secondary storage 150b locations. For example, source storage locations in a primary storage volume 1 of storage 150a may be mirrored in a data replication operation to target storage locations of a secondary volume2 of the storage 150b.

With embodiments, the consistent asynchronous mirror relationship 242 is a peer-to-peer mirror relationship for a pair of storage locations in which updates to the primary (source) storage locations of the mirror relationship are mirrored to the secondary (target) storage locations of the mirror relationship.

With the consistent asynchronous mirror copy 262, an asynchronous mirror copy 264 is initiated from the primary volume to the secondary volume. This results in: a momentary pause of application writes (e.g., fraction of millisecond to few milliseconds), creation of a point-in-time consistency group using the OOS data structure 236, with new updates being saved using the change recording data structure 238. Then, application writes are restarted, with a complete write (drain) of point-in-time consistent data to the secondary volume that is stopped after all consistent data has been copied to the secondary volume. Next, there is are point-in-time copies 266 to tertiary storage that occur periodically. With embodiments, every time a consistency group (CG) is formed, the consistent asynchronous mirror copy 262 commits. The consistency group is formed when the point-in-time copy from the secondary volume to the tertiary volume completes (which may occur every 3-5 seconds, depending on how heavy the write workload is and what kind of bandwidth there is between the primary volume and the secondary volume.

The asynchronous mirror copy operation 264 may be performed with a synchronous PPRC establish copy operation or with an extended distance PPRC copy operation. The asynchronous mirror copy operation is not consistent.

In an asynchronous data replication mode, updates to the primary storage locations of the primary storage 150a may be indicated in data structures, such as OOS data structure 236. Indicators of the OOS data structure 236 are cleared as the storage manager 230 copies updates indicated in the OOS data structure 236 to the corresponding storage locations of the secondary storage 150b of secondary storage controller 120b.

The storage manager 232 accesses updates to the primary storage 150a to write to the corresponding storage locations in the storage 150b. In some applications, the copying and relationship functions may be performed by devices external to the storage systems 115a, 115, such as the hosts, for example. For an asynchronous mirror relationship 244, the consistent asynchronous mirror system 232 mirrors each write update to the primary storage 150a over to the secondary storage 150b. With the consistent asynchronous mirror system 232, the I/O operation insofar as the host initiating the operation is concerned, is considered to be complete upon successful write of the update to the primary storage 150a. Accordingly, the host may be notified that the I/O operation was successfully completed notwithstanding that the update data has not yet been mirrored to the secondary storage 150b.

Periodically, volumes in an asynchronous mirror relationship 244 may be configured into a consistency group to ensure that a group of updates made to volumes at the primary system are also eventually made on the volumes of the consistency group to maintain data consistency as of a particular point in time or a particular set of data for those volumes of the group. Accordingly, additional updates to an OOS data structure may be stopped at a particular point in time to form a consistency group between volumes of the primary system and the secondary system. Any unprocessed updates as indicated by the OOS data structure are transferred to the secondary storage so that the volumes of the consistency group are consistent as of the point in time at which updates were no longer added to the OOS data structure.

In contrast to the asynchronous mode, in a synchronous mode, an I/O operation which performed a write operation to the primary storage 120a is not considered complete until the mirror operation is completed, that is, it is not complete until the update data has been successfully replicated to the secondary storage 120b. Should the mirror operation fail such that the update is not successfully mirrored to the storage 120b, the host may be notified that the update operation was not successfully completed.

The storage manager 232 may transfer data from the primary storage 150a to the secondary storage 150b in tracks. As used herein, the term track may refer to a track of a disk storage unit, but may also reference to other units of data (or data units) configured in the storage 150a, 150b, such as a bit, byte, word, segment, page, block (such as a Logical Block Address (LBA)), etc., which may be a part of a larger grouping of data units, such as those stored collectively as a volume, logical device, etc. of data.

In one embodiment, the storage devices 150a, 150b may be comprised of one or more sequential access storage devices, such as hard disk drives and magnetic tape or may include non-sequential access storage devices such as solid state drives (SSD), for example. Each storage device 150a, 150b may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

Furthermore, as used herein, the term "unit of storage" or "storage unit" refers to a storage location containing one or more units of data storage capable of storing one or more data units such as one or more volumes, cylinders, tracks, segments, extents, or any portion thereof, or other unit or units of data suitable for transfer. Thus, a source storage unit and the associated target storage unit may each be a storage volume. However, it is appreciated that a source storage unit and a target storage unit may each be of a size other than a volume, for example.

The system components 100a, 100b, . . . 100n, 120a, 120b, 220, 150a, 150b, 250 are connected to the network 110 which enables communication among these components. Thus, the network 110 includes a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage subsystems to the hosts 100a, 100b, 100n may be based upon a particular host attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Users (e.g., customers) may want to utilize their remote sites, which may be Disaster Recovery (DR) sites, and make them production sites to justify the cost of the remote sites. A remote site may be used by a mining application for analytics and data mining. To perform analytics and data mining from an asynchronous remote site requires taking a consistent snapshot of the data on the remote site. This is not an easy task as the mining application does not know when the data is consistent on the remote site. However, the mining software does not necessarily care about an exact point in time (i.e., the data may be a little old), but just needs consistent data.

For a consistent asynchronous mirror relationship involving a first volume, a secondary volume, and a tertiary volume, embodiments allow a user to take a point-in-time copy on the secondary volume to a fourth volume. With embodiments, there are no changes to the host application and minimal changes to the copy operations. Thus, with embodiments, there is minimal storage controller microcode changes and minimal code changes. For example, embodiments newly create the point-in-time copy metadata for the point-in-time copy from the secondary volume to the accessible consistent copy volume and new code to check it in.

Figure 4:
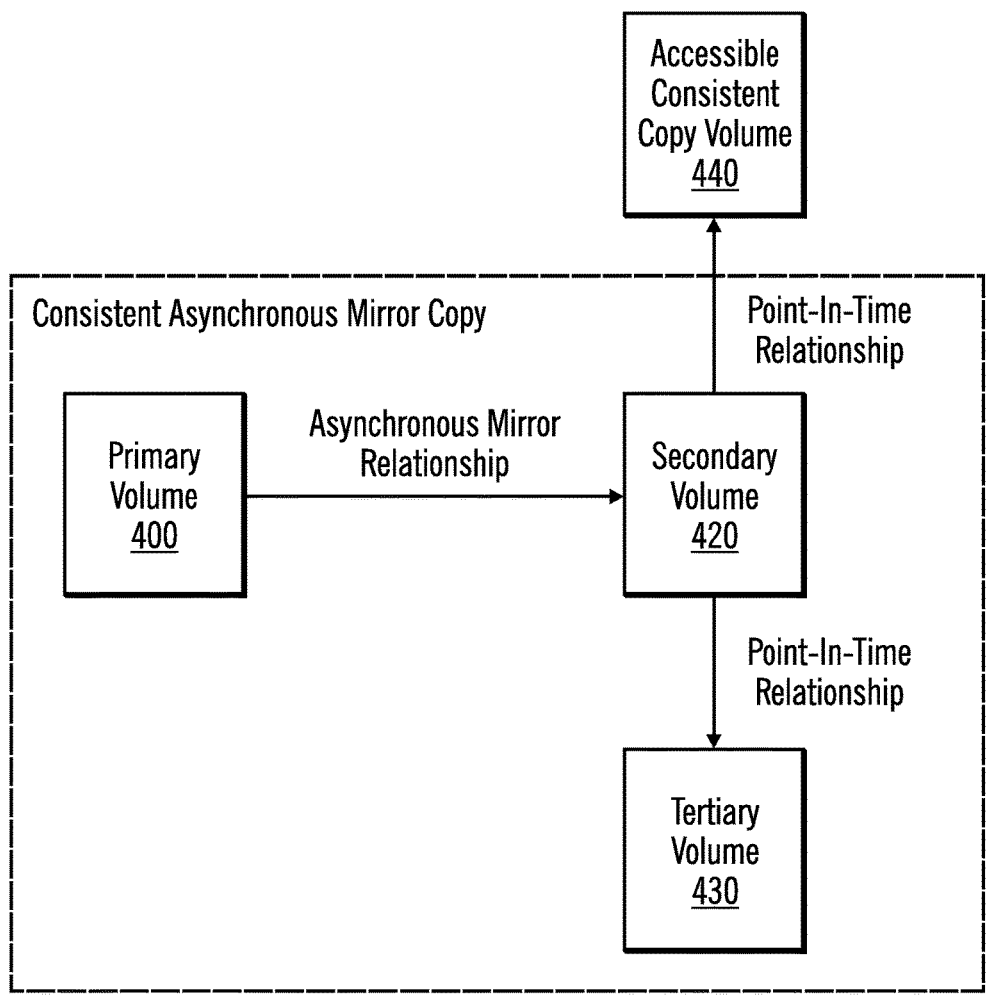
FIG. 4 illustrates relationships in accordance with certain embodiments.

FIG. 4 illustrates relationships between volumes in accordance with certain embodiments. The volumes of FIG. 4 are stored in storage devices. A primary volume is in an asynchronous mirror relationship with a secondary volume 420. Also, a point-in-time copy has been made from the secondary volume 420 to a tertiary volume 430. With embodiments, an additional point-to-point copy is made from the secondary volume 420 to an accessible consistent copy volume 440. The accessible consistent copy volume 440 is readable and writable. With embodiments, the tertiary volume 430 is being updated frequently (e.g., every 3-5 seconds), and is not readable for data mining. Thus, embodiments, create the accessible consistent copy volume for use in data mining. The volumes 400, 420, and 430 are in a consistent asynchronous mirror relationship. The volumes 400 and 420 are in an asynchronous mirror relationship and use an OOS data structure stored on volume 400. The volumes 420 and 430 are in a point-in-time relationship and use a target data structure stored on volume 430. The volumes 420 and 440 are in a point-in-time relationship and use a target data structure stored on volume 440.

Figure 5:
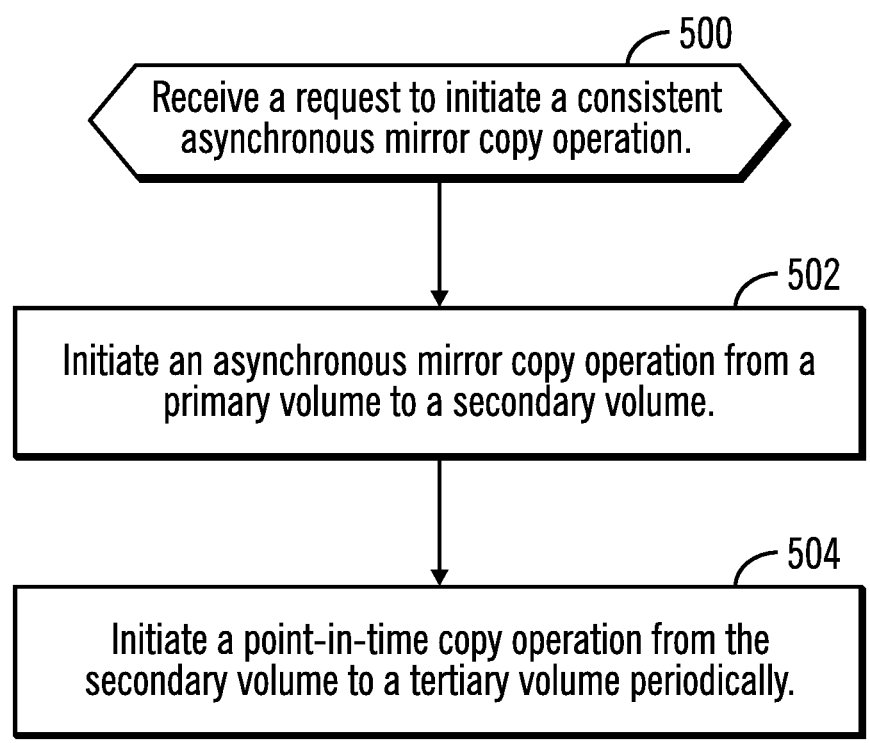
FIG. 5 illustrates, in a flowchart, operations for a consistent asynchronous mirror copy operation in accordance with certain embodiments.

FIG. 5 illustrates, in a flowchart, operations for a consistent asynchronous mirror copy operation in accordance with certain embodiments. Control begins at block 500 with the consistent asynchronous mirror system 232 receiving a request to initiate a consistent asynchronous mirror copy operation. In block 502, the consistent asynchronous mirror system 232 initiates an asynchronous mirror copy operation from a primary volume to a secondary volume. In block 504, the consistent asynchronous mirror system 232 initiates a point-in-time copy operation from the secondary volume to a tertiary volume periodically.

Figure 6:
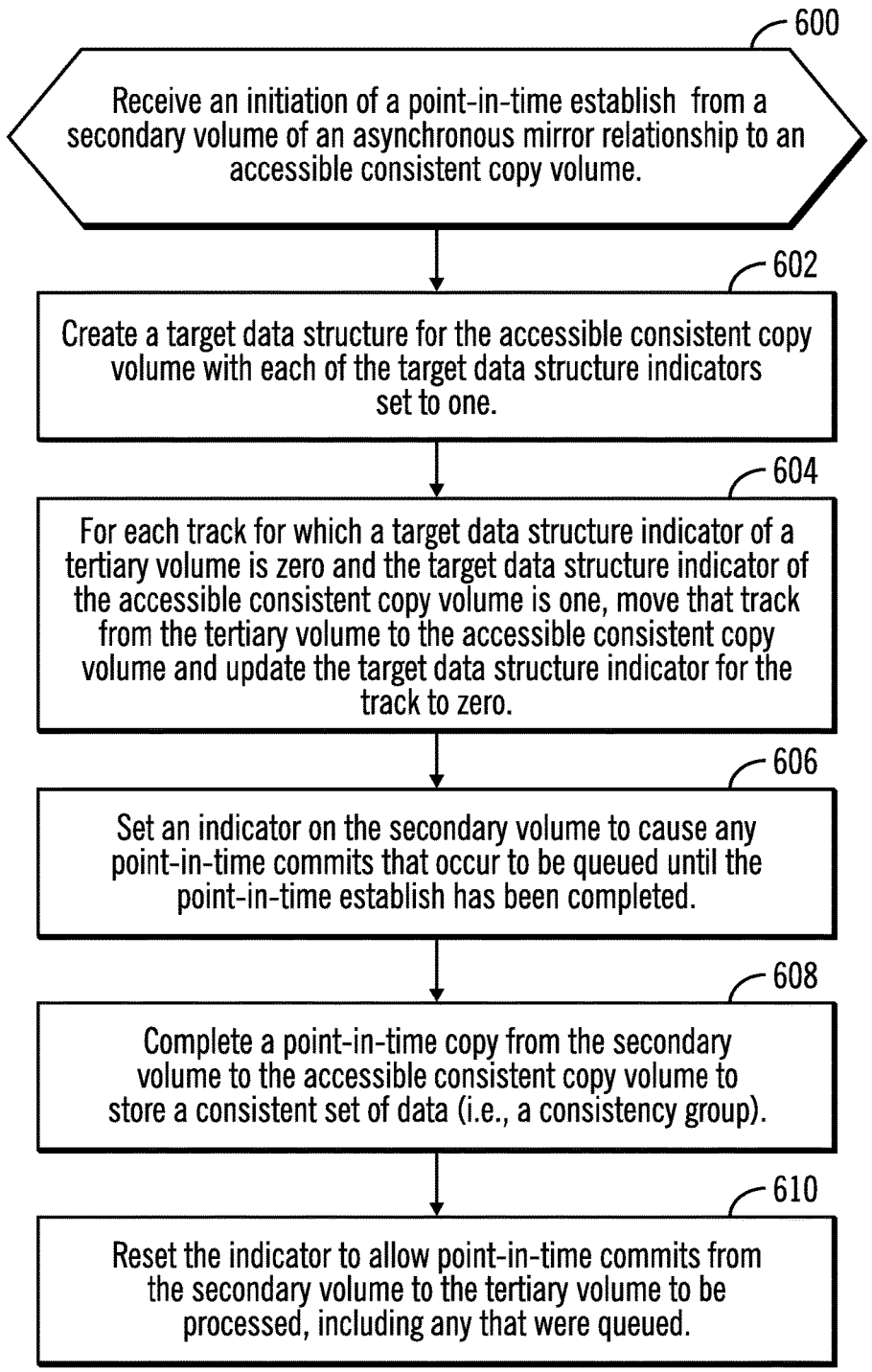
FIG. 6 illustrates, in a flowchart, operations for consistent point-in-time copy of a consistent asynchronous mirror target without pausing the consistent asynchronous mirror copy in accordance with certain embodiments.

FIG. 6 illustrates, in a flowchart, operations for consistent point-in-time copy of a consistent asynchronous mirror target without pausing the consistent asynchronous mirror copy in accordance with certain embodiments.

Control begins at block 600 with the consistent asynchronous mirror system 232 receiving an initiation of a point-in-time establish from a secondary volume of an asynchronous mirror relationship to an accessible consistent copy volume. This occurs after the operations of FIG. 5. The asynchronous mirror relationship is part of a consistent asynchronous mirror relationship involving a first volume, a second volume, and a tertiary volume. With embodiments, the point-in-time establish starts a point-in-time relationship for a point-in-time copy from the secondary volume to the accessible consistent copy volume.

In block 602, the consistent asynchronous mirror system 232 creates a target data structure for the accessible consistent copy volume with each of the target data structure indicators set to one (to indicate that consistent data has not been copied over to the accessible consistent copy volume yet for each of the tracks).

In block 604, for each track for which the target data structure indicator of the tertiary volume is zero and the target data structure indicator of the accessible consistent copy volume is one, the consistent asynchronous mirror system 232 moves that track from the tertiary volume to the accessible consistent copy volume and updates the target data structure indicator of the accessible consistent copy volume for the track to zero (to indicate that consistent data has been copied over to the accessible consistent copy volume for this track).

In block 606, the consistent asynchronous mirror system 232 sets an indicator on the secondary volume to cause any point-in-time commits that occur to be queued until the point-in-time establish has been completed.

In block 608, the consistent asynchronous mirror system 232 completes the point-in-time copy from the secondary volume to the accessible consistent copy volume to store a consistent set of data (i.e., a consistency group). With embodiments, there is a background copy of data from the secondary volume to the accessible consistent copy volume. When data for a track is actually copied over from the secondary volume to the accessible consistent copy volume, then the corresponding indicator in the target data structure is set to zero. For example, if the data of a track at the secondary volume is being updated (e.g., for a new consistency group), then the data is first copied over to the accessible consistent copy volume and the target data structure indicator for the track is set to zero (to indicate that consistent data has been copied over to the accessible consistent copy volume for this track).

Thus, with embodiments, as soon as the point-in-time establish comes in, (for a point-in-time copy from the secondary volume to the accessible consistent copy volume), the indictors in the target data structure are set to ones immediately, without waiting for a new consistency group to form. Embodiments get consistent data from a combination of secondary volume (block 608) and the tertiary volume (block 604) from a previous consistency group that formed (and not from a future consistency group).

In block 610, the consistent asynchronous mirror system 232 resets the indicator to allow point-in-time commits from the secondary volume to the tertiary volume to be processed, including any that were queued.

With embodiments, the consistent asynchronous mirror system 232 gives the host access to a consistent point of data, without any knowledge of the consistent asynchronous mirror copy. Thus, with embodiments, there is no impact to the consistent asynchronous mirror copy.

With embodiments, a user issues a point-in-time establish from the secondary volume that is part of a consistent asynchronous mirror copy operation to a target volume (the accessible consistent copy volume), which stores a readable copy of consistent data. The point-in-time copy recognizes that the point-in-time source (in this case the secondary volume) is in a consistent asynchronous mirroring relationship. Embodiments preserve the next consistent data set at the target volume.

Thus, with embodiments, at a time when the point-in-time copy from the secondary volume to the accessible consistent copy volume is established ("establish time"), a background copy task is kicked off that scans the target data structure for the tertiary copy for zeros and moves the tracks represented by those indicators to the secondary volume, when the corresponding tracks on the accessible consistent copy volume also have the target data structure indicators set to one (and at this point the target data structure is turned off at the secondary volume). The reason for doing this is to ensure the data at the tertiary volume (representing the current consistency group) is hardened at the accessible consistent copy volume, and this will allow the next consistency group to proceed (otherwise the data would be overwritten). That is, the target data structure indicates that the consistent data is on the tertiary volume, but not yet copied to the accessible consistent copy volume. If that is the case, then the data from the tertiary volume is copied to the accessible consistent copy volume (because consistency groups will continue to form and eventually the tertiary volume will represent a different consistency group).

Also at establish time of the accessible consistent copy volume, an indicator is set on the secondary volume. This indicator, when set, causes point-in-time copy commits that occur to be queued at the secondary volume until all background tasks are complete. The indicator is reset on a per device level when the corresponding background copy task completes.

Figure 7:
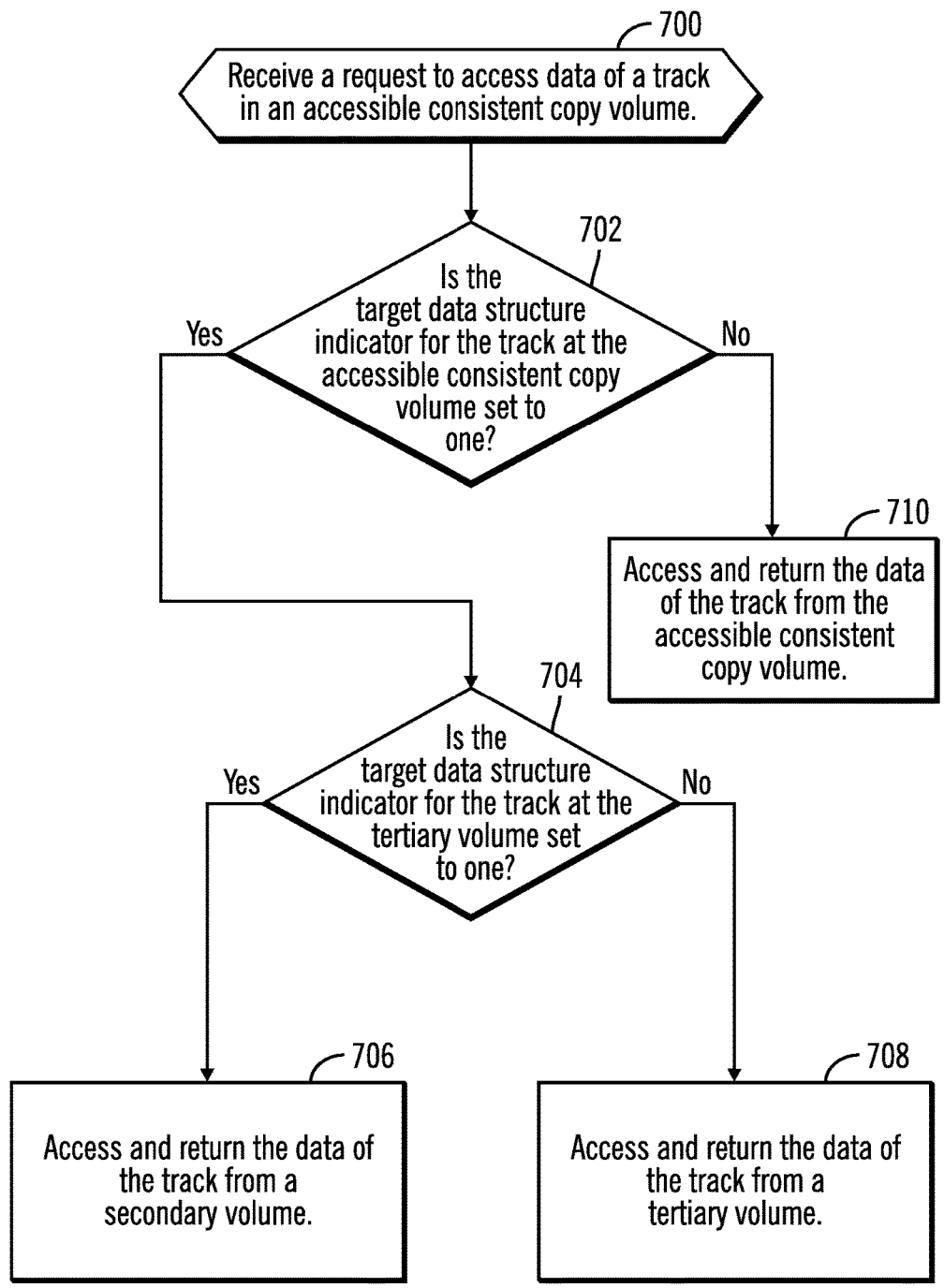
FIG. 7 illustrates, in a flowchart, operations for access of data of a track in accordance with certain embodiments.

FIG. 7 illustrates, in a flowchart, operations for access of data of a track in accordance with certain embodiments. Control begins at block 700 with the consistent asynchronous mirror system 232 receiving a request to access data of a track in an accessible consistent copy volume. The access may be for a read or a write. Also, the access request may be from a data mining application for performing analytics and data mining.

In block 702, the consistent asynchronous mirror system 232 determines whether the target data structure indicator for the track at the accessible consistent copy volume is set to one. If so, processing continues to block 704, otherwise, processing continues to block 710.

In block 704, the consistent asynchronous mirror system 232 determines whether the target data structure indicator for the track at the tertiary volume is set to one. If so, processing continues to block 706, otherwise, processing continues to block 708.

In block 706, the consistent asynchronous mirror system 232 accesses and returns the data of the track from a secondary volume. That is, if the target data structure indicator for the track at the accessible consistent copy volume is set to one (and so the data has not been copied from the secondary volume) and the target data structure indicator for the track at the tertiary volume is set to one (and so the data has not been copied from the secondary volume), this indicates that the data at the secondary volume is consistent.

In block 708, the consistent asynchronous mirror system 232 accesses and returns the data of the track from a tertiary volume. That is, if the target data structure indicator for the track at the accessible consistent copy volume is set to one (and so the data has not been copied from the secondary volume) and the target data structure indicator for the track at the tertiary volume is set to zero (and so the data has been copied from the secondary volume to the tertiary volume), this indicates that the data at the tertiary volume is consistent.

In certain embodiments, when data for a track is accessed from the secondary volume (block 706) or the tertiary volume (block 708), the data is also copied over to the accessible consistent copy volume and the target data structure indicator for the track at the accessible consistent copy volume is set to zero.

If the target data structure indicator for the track at the accessible consistent copy volume is set to zero, processing continues to block 710 from block 702. In block 710, the consistent asynchronous mirror system 232 accesses and returns the data of the track from the accessible consistent copy volume. That is, if the target data structure indicator for the track at the accessible consistent copy volume is set to zero, this indicates that the data has been copied from the secondary volume to the accessible consistent copy volume.

In a consistent asynchronous mirror copy, embodiments create a set of data at the remote site (the accessible consistent copy volume) to be used for non-time sensitive production, which requires that the set of data is internally consistent. While the consistent asynchronous mirror copy is running, embodiments select the previous consistency group for getting the consistent data by using the data of the secondary volume and having a set of rules for accessing the set of data from the secondary volume, the tertiary volume, and the accessible consistent copy volume to get consistent data.

Embodiments prevent/pause future commits on the secondary volume during the point-in-time copy from the secondary volume to the accessible consistent copy volume to enable formation of consistent copies. Also, embodiments select the next consistency group for creating consistent data at the accessible consistent copy volume.

Thus, embodiments redirect access requests to the accessible consistent copy volume to the secondary volume or the tertiary volume. Also, embodiments include a copy task that allows a point-in-time copy off of the secondary volume that maintains the current consistency group.

With embodiments, a consistent copy is created for data analytics without knowing about or affecting the consistent asynchronous mirror copy environment or host access time. With embodiments, the host does not know about the consistent asynchronous mirror copy environment.

Figure 8:
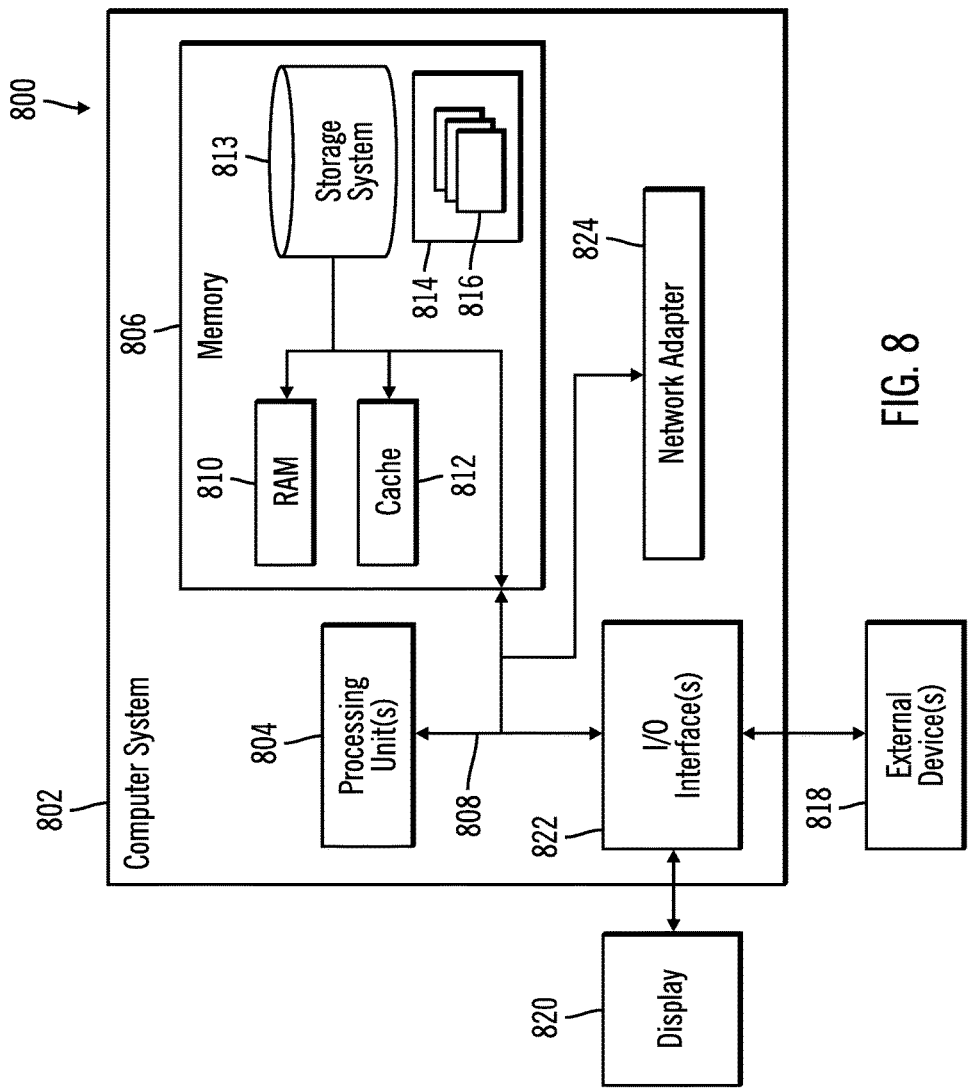
FIG. 8 illustrates a computing architecture in which the components of FIG. 1 may be implemented in accordance with certain embodiments.

FIG. 8 illustrates a computing architecture in which the components of FIG. 1 may be implemented in accordance with certain embodiments. In certain embodiments, the hosts 100a, 100b, . . . 100n and the storage controllers 120a, 120b, 220 may implement computer architecture 800.

Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 811 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where, if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
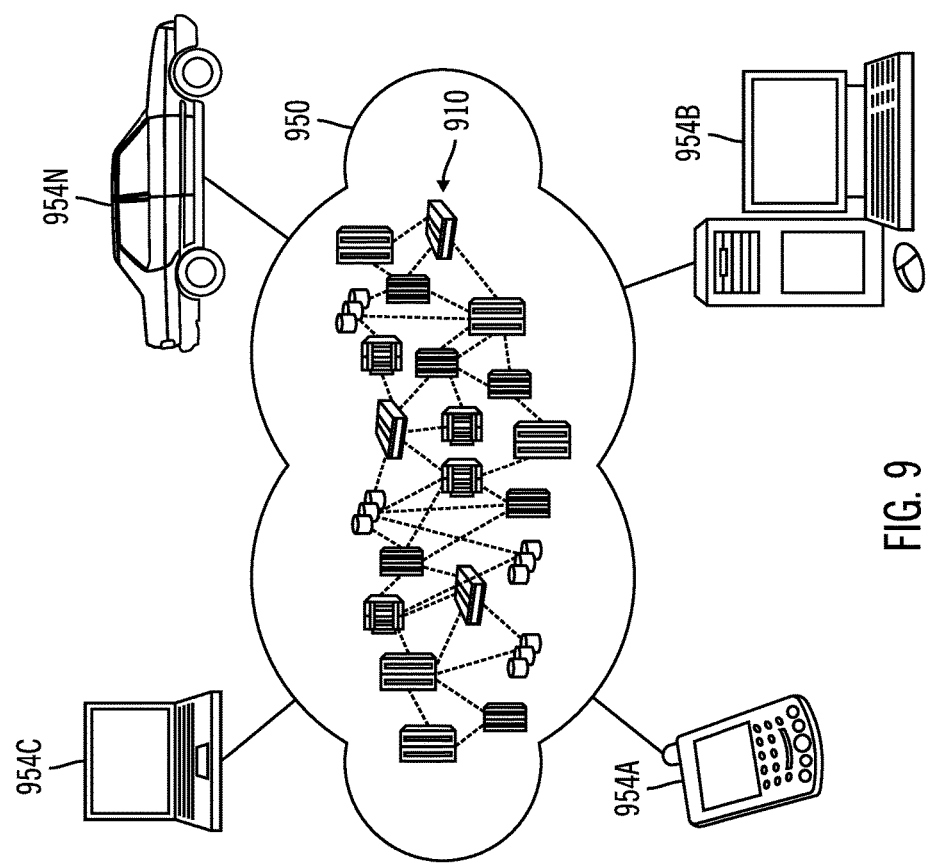
FIG. 9 illustrates a cloud computing environment in accordance with certain embodiments.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
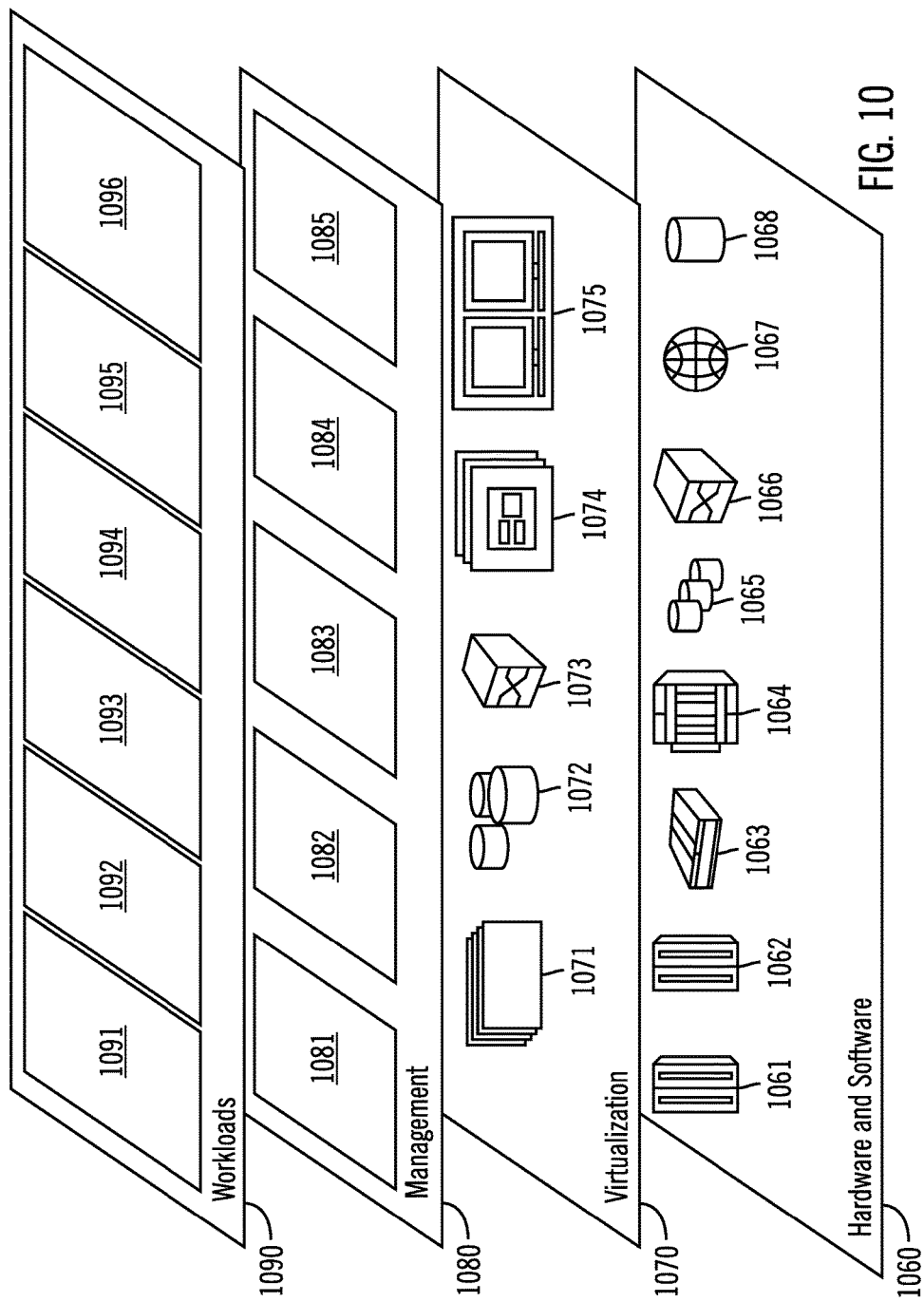
FIG. 10 illustrates abstraction model layers in accordance with certain embodiments.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and delayed consistent point-in-time copy from a secondary volume in an asynchronous mirror relationship 1096.

Thus, in certain embodiments, software or a program, implementing delayed consistent point-in-time copy from a secondary volume in an asynchronous mirror relationship in accordance with embodiments described herein, is provided as a service in a cloud infrastructure.

In certain embodiments, the components of FIG. 1 are part of a cloud infrastructure. In other embodiments, the components of FIG. 1 are not part of a cloud infrastructure.
Additional Embodiment Details The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
    performing a consistent asynchronous mirror copy that includes an asynchronous mirror copy from a primary volume to a secondary volume and a point-in-time copy from the secondary volume to a tertiary volume;
    creating a point-in-time copy from the secondary volume to an accessible consistent copy volume;
    in response to receiving a request to access a track of the accessible consistent copy volume, determining whether to access the track of one of the secondary volume, the tertiary volume, and the accessible consistent copy volume; and
    responding to the request with data accessed from the determined one of the secondary volume, the tertiary volume, and the accessible consistent copy volume.

2. The computer program product of claim 1, wherein the program code is executable by the at least one processor to perform:
    in response to determining that a target data structure indicator for the track at the accessible consistent copy volume is set to one and a target data structure indicator for the track at the tertiary volume is set to one, accessing the data at the secondary volume.

3. The computer program product of claim 1, wherein the program code is executable by the at least one processor to perform:
    in response to determining that a target data structure indicator for the track at the accessible consistent copy volume is set to one and a target data structure indicator for the track at the tertiary volume is set to zero, accessing the data at the tertiary volume.

4. The computer program product of claim 1, wherein the program code is executable by the at least one processor to perform:
    in response to determining that a target data structure indicator for the track at the accessible consistent copy volume is set to one, accessing the data at the accessible consistent copy volume.

5. The computer program product of claim 1, wherein the program code is executable by the at least one processor to perform:
    setting an indicator on the secondary volume to cause any point-in-time commits that occur to be queued until the point-in-time establish has been completed.

6. The computer program product of claim 1, wherein hosts, storage controllers, and storage containing the primary volume, the secondary volume, the tertiary volume, and the accessible consistent copy volume are nodes in a cloud infrastructure.

7. The computer program product of claim 1, wherein a Software as a Service (SaaS) is configured to perform computer program product operations.

8. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations comprising:

performing a consistent asynchronous mirror copy that includes an asynchronous mirror copy from a primary volume to a secondary volume and a point-in-time copy from the secondary volume to a tertiary volume;

creating a point-in-time copy from the secondary volume to an accessible consistent copy volume;

in response to receiving a request to access a track of the accessible consistent copy volume, determining whether to access the track of one of the secondary volume, the tertiary volume, and the accessible consistent copy volume; and responding to the request with data accessed from the determined one of the secondary volume, the tertiary volume, and the accessible consistent copy volume.

9. The computer system of claim 8, wherein the operations further comprise:

in response to determining that a target data structure indicator for the track at the accessible consistent copy volume is set to one and a target data structure indicator for the track at the tertiary volume is set to one, accessing the data at the secondary volume.

10. The computer system of claim 8, wherein the operations further comprise:

in response to determining that a target data structure indicator for the track at the accessible consistent copy volume is set to one and a target data structure indicator for the track at the tertiary volume is set to zero, accessing the data at the tertiary volume.

11. The computer system of claim 8, wherein the operations further comprise:

in response to determining that a target data structure indicator for the track at the accessible consistent copy volume is set to one, accessing the data at the accessible consistent copy volume.

12. The computer system of claim 8, wherein the operations further comprise:

setting an indicator on the secondary volume to cause any point-in-time commits that occur to be queued until the point-in-time establish has been completed.

13. The computer system of claim 8, wherein hosts, storage controllers, and storage containing the primary volume, the secondary volume, the tertiary volume, and the accessible consistent copy volume are nodes in a cloud infrastructure.

14. The computer system of claim 8, wherein a Software as a Service (SaaS) is configured to perform computer system operations.

15. A method, comprising:

performing, with a processor of a computer, a consistent asynchronous mirror copy that includes an asynchronous mirror copy from a primary volume to a secondary volume and a point-in-time copy from the secondary volume to a tertiary volume;

creating a point-in-time copy from the secondary volume to an accessible consistent copy volume;

in response to receiving a request to access a track of the accessible consistent copy volume, determining whether to access the track of one of the secondary volume, the tertiary volume, and the accessible consistent copy volume; and responding to the request with data accessed from the determined one of the secondary volume, the tertiary volume, and the accessible consistent copy volume.

16. The method of claim 15, further comprising:

in response to determining that a target data structure indicator for the track at the accessible consistent copy volume is set to one and a target data structure indicator for the track at the tertiary volume is set to one, accessing the data at the secondary volume.

17. The method of claim 15, further comprising:

in response to determining that a target data structure indicator for the track at the accessible consistent copy volume is set to one and a target data structure indicator for the track at the tertiary volume is set to zero, accessing the data at the tertiary volume.

18. The method of claim 15, further comprising:

in response to determining that a target data structure indicator for the track at the accessible consistent copy volume is set to one, accessing the data at the accessible consistent copy volume.

19. The method of claim 15, further comprising:

setting an indicator on the secondary volume to cause any point-in-time commits that occur to be queued until the point-in-time establish has been completed.

20. The method of claim 15, wherein a Software as a Service (SaaS) is configured to perform method operations.

* * * * *